Figure 1:
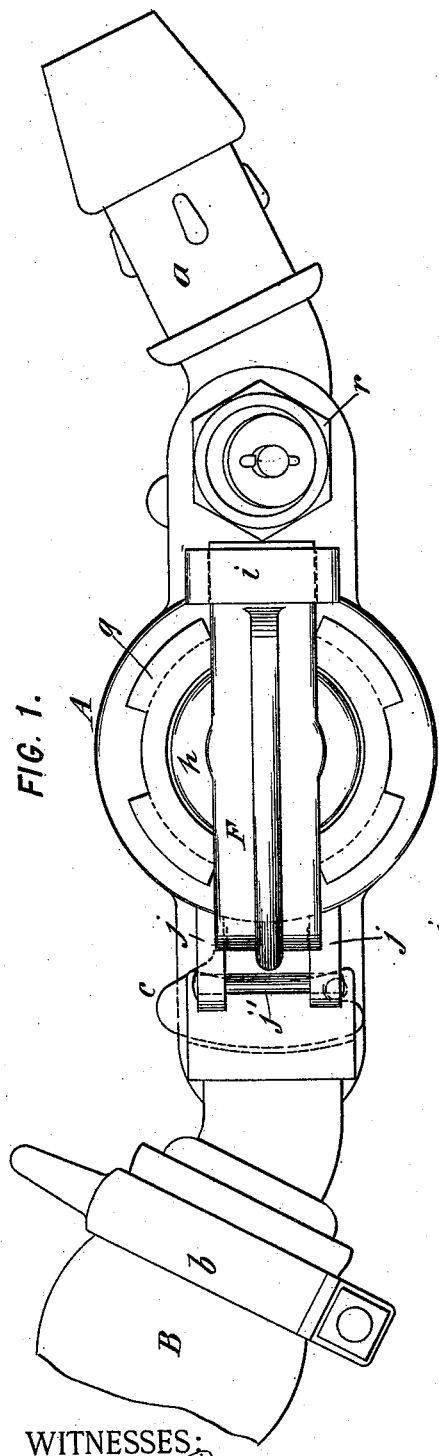

(No Model.) 4 Sheets—Sheet 1.

E. E. GOLD.
HOSE COUPLING.

No. 466,561. Patented Jan. 5, 1892.

WITNESSES:
John Becker
Fred White

INVENTOR:
Edward E. Gold,
By his Attorneys,
Arthur E. Fraser & Co.

(No Model.) 4 Sheets—Sheet 2.
E. E. GOLD.
HOSE COUPLING.
No. 466,561. Patented Jan. 5, 1892.
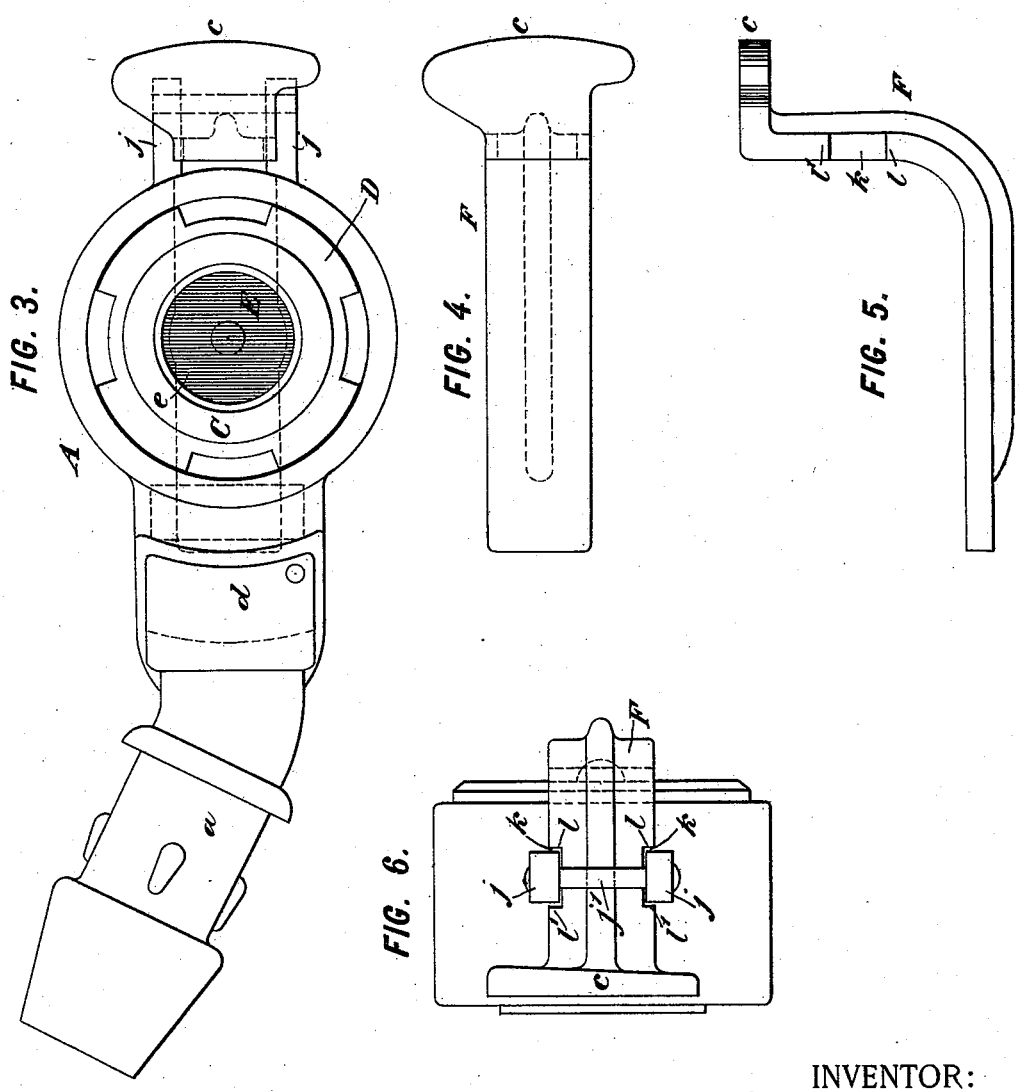
WITNESSES:
John Becker
Fred White
INVENTOR:
Edward E. Gold,
By his Attorneys,
Arthur C. Fraser & Co.

(No Model.) 4 Sheets—Sheet 3.
E. E. GOLD.
HOSE COUPLING.

No. 466,561. Patented Jan. 5, 1892.

WITNESSES:
John Becker
Fred White

INVENTOR:
Edward E. Gold,
By his Attorneys,
Arthur B. Fraser & Co.

(No Model.) 4 Sheets—Sheet 4.

E. E. GOLD.
HOSE COUPLING.

No. 466,561. Patented Jan. 5, 1892.

WITNESSES:
John Becker
Fred White

INVENTOR:
Edward E. Gold,
By his Attorneys,
Arthur C. Fraser

United States Patent Office.

EDWARD E. GOLD, OF NEW YORK, N. Y.

HOSE-COUPLING.

SPECIFICATION forming part of Letters Patent No. 466,561, dated January 5, 1892.

Application filed October 5, 1891. Serial No. 407,756. (No model.)

*To all whom it may concern:*

Be it known that I, EDWARD E. GOLD, a citizen of the United States, residing in the city, county, and State of New York, have invented certain new and useful Improvements in Hose-Couplings, of which the following is a specification.

This invention relates to couplings for uniting together sections of hose or flexible or jointed pipe—such, for example, as the steam-heating or air-brake pipes of railway-cars.

The invention relates to twin couplings of that class having lateral seats or ports. Couplings of this class have heretofore been of two kinds: first, those in which the seating-faces are forced together to make a steam or air tight joint by the action of reciprocal wedging-faces on the locking provisions, and the second those in which the locking together of the two heads is not relied upon to make a steam or air tight joint, but the internal pressure is utilized through the medium of a diaphragm or other mobile part to exert a pressure against the seats to force them into close contact and prevent leakage when the steam or other fluid pressure is turned on.

To the first species above indicated belong the Westinghouse coupling and the Gold interchangeable coupling, while to the second species belong the Gibbs coupling and other proposed couplings which have not come into general use. The improved coupling provided by my present invention belongs also to the second species, being adapted, if properly proportioned, to intercouple with the said Gibbs coupling.

In couplings of the second species referred to the usual construction involves coupling heads or bodies with locking provisions for coupling them together, and seats which are mounted movably relatively to the heads and adapted to be pressed together by a movement independent of the heads and on turning on internal pressure. In some instances the seats have been mounted on annular diaphragms, while in other instances they have been formed as pistons movable relatively to the heads. All of the constructions of this character have been, as I believe, disadvantageous by reason of inherent weakness or other mechanical difficulties involved in the mounting of the seats movably with relation to the heads, although otherwise desirable and having the important advantage of insuring a joint that is least liable to leak with the highest pressures.

The object of my invention is to produce an improved coupling of this species which shall retain the advantages and overcome the disadvantages of prior couplings of this type. To this end, instead of mounting the seats movably relatively to the coupling-heads, I mount the seats fixedly or unyieldingly in the heads, and in order to utilize the internal fluid-pressure as a means for forcing the seats together with a tightness proportional to the pressure I provide a distinct diaphragm or other equivalent movable part on the opposite or outer side of each coupling-head adapted to be thrust outwardly by the fluid-pressure, and I provide a means for communicating this outward thrust from the diaphragm or movable part of each head to the opposite head, whereby to press the respective seats together. The outward thrust of each diaphragm in direction away from its own seat is thereby exerted against the opposite head to draw the latter bodily in direction toward the seat of the head to which the diaphragm pertains. The means for communicating this thrust to the opposite head may be any suitable projection or provision thereon, or preferably a separate piece in the nature of a lever or movable arm, on one or both ends of which are formed one or both of the respective locking-faces for coupling the two heads together. The employment of this separate lever or arm has the advantage that the thrust of the diaphragm not only acts to press the seats together, but also retains the locking-faces in equally intimate contact by communicating the thrust through the locking-faces to the seats.

Figure 2:
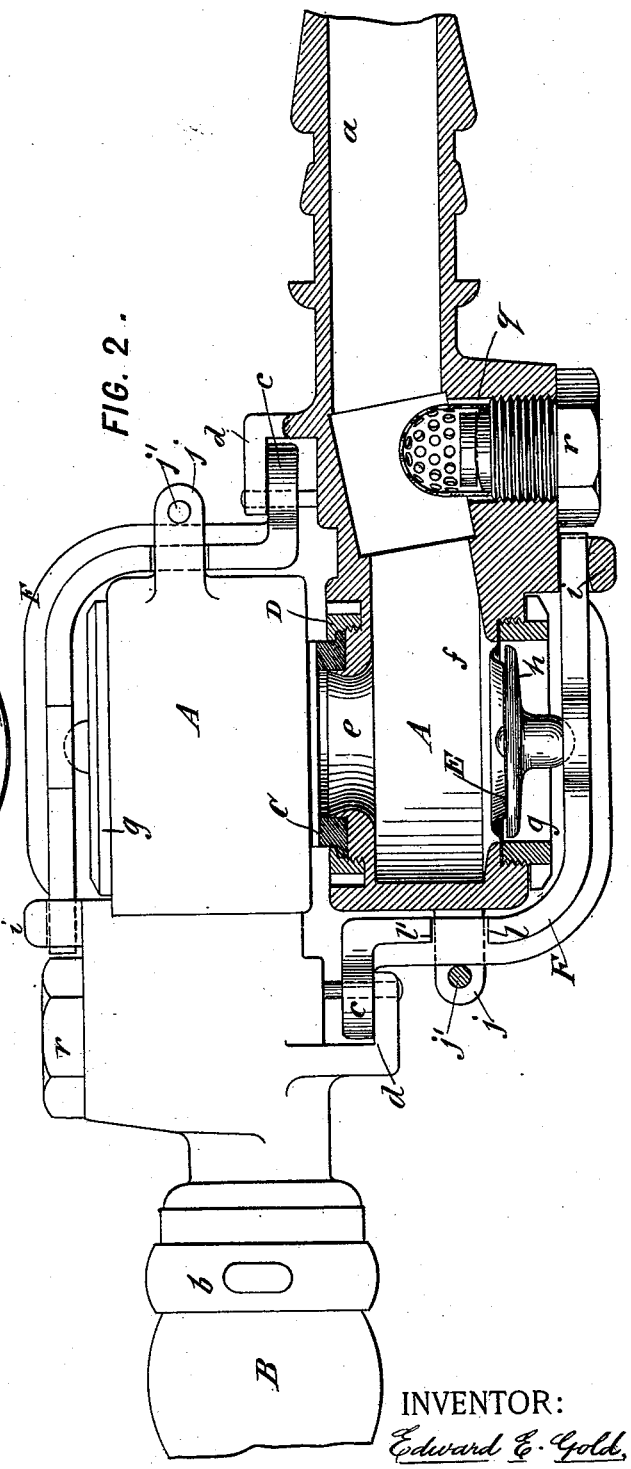

Figure 1 of the accompanying drawings is a side elevation of a pair of couplings constructed according to my present invention in the coupled position. Fig. 2 is a plan thereof in horizontal section through one of the coupling-heads. Fig. 3 is a face view of one of the coupling-heads. Figs. 4 and 5 are front and side views of the lever-arm. Fig. 6 is an end view of one of the coupling-heads.

Figure 7:
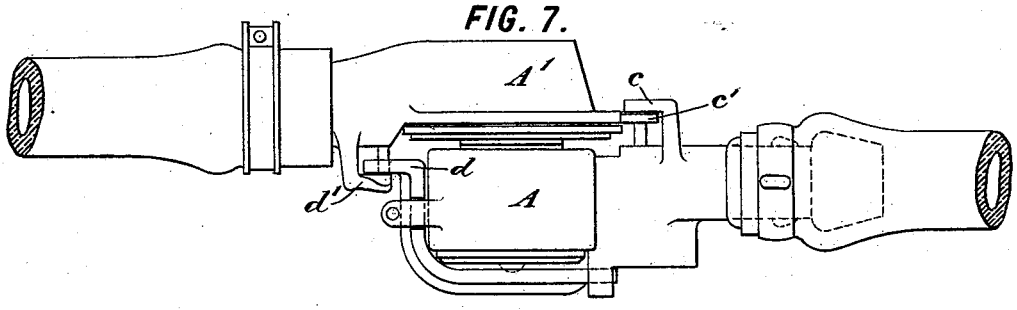
Figure 8:
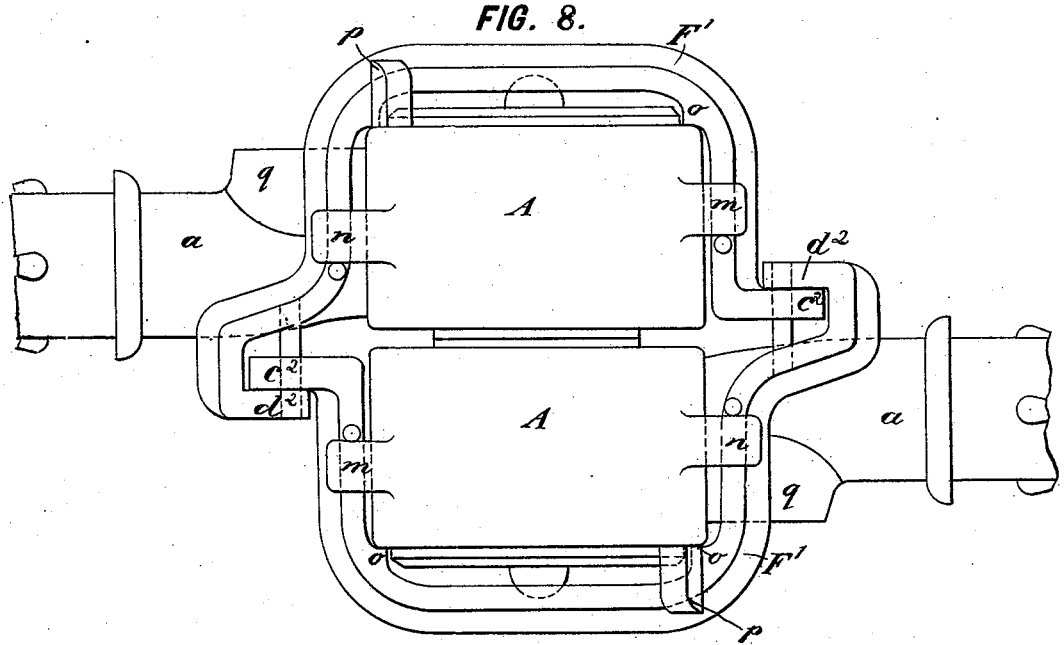
Figure 9:
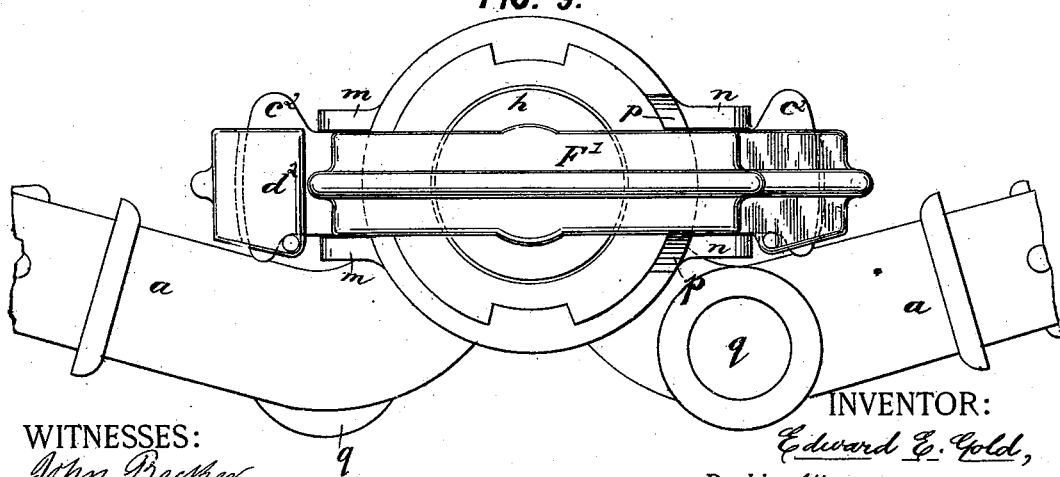
Figure 10:
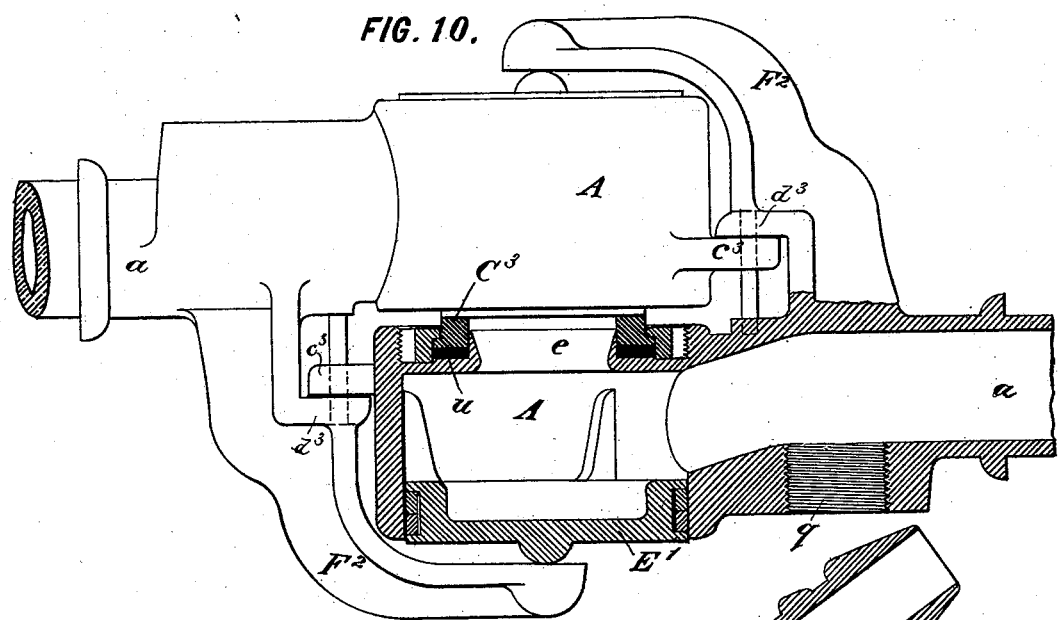
Figure 11:
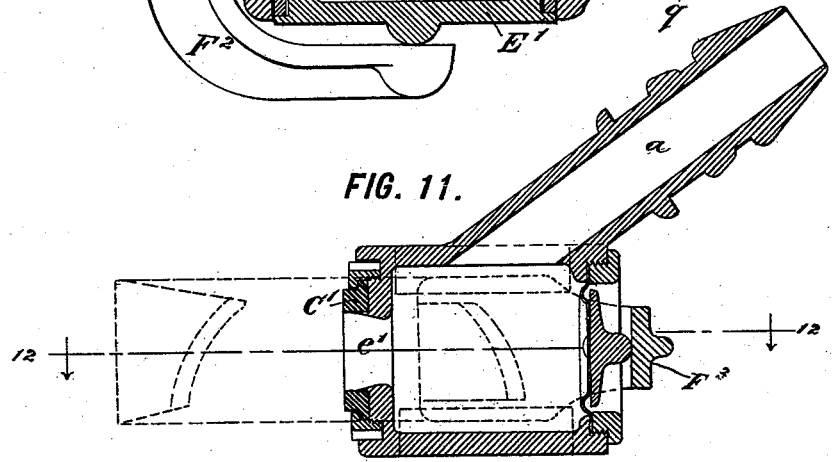
Figure 12:
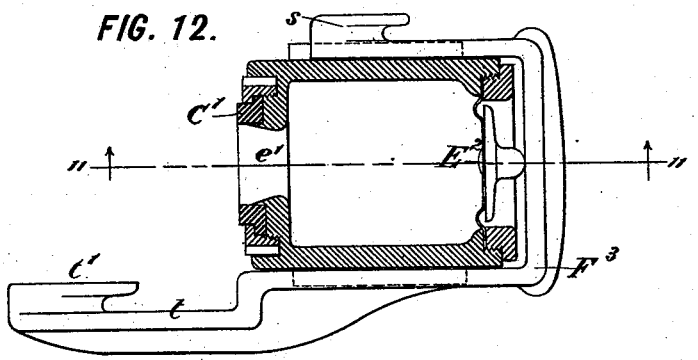

Fig. 7 is a plan view showing my improved coupling intercoupled with a Gibbs coupler. Fig. 8 is a plan view showing a modified construction of my improved coupler. Fig. 9 is a side elevation of the coupler shown in Fig. 8. Fig. 10 is an elevation of a pair of couplers involving a modified construction of my invention, one of the coupling-heads being shown in horizontal section. Figs. 11 and 12 illustrate a modification wherein my invention is applied to a direct port-coupling, Fig. 11 being a vertical mid-section on the line 11 11 in Fig. 12 and the latter a horizontal section on the line 12 12 in Fig. 11.

The couplings shown in the drawings are designed for attachment to the ends of sections of flexible hose that are to be coupled together, these hose-sections being ordinarily the terminal sections of the steam-heating pipes or air-brake pipes of railway-cars.

Let A A designate the coupling heads, sections, or bodies, each of which is provided with a tubular neck or shank $a$, adapted for attachment to the end of a hose-section B in any suitable known manner—as, for example, by a clamp $b$, as shown in Figs. 1 and 2. The heads A A are adapted to be coupled together side by side by means of suitable locking projections or wedging-surfaces, which are interengaged by a relative movement of the heads, preferably by an oscillatory movement thereof. These locking provisions consist in the constructions shown of two diametrically-opposite arms or plates $c$ and $d$ on each head. The arm $c$ projects directly outward from the head at one side, while the arm $d$ on the other side is formed as an angle-piece or bracket to carry it beyond the plane of the other head, in order that the arm $d$ on each head shall engage the arm $c$ on the other head, their contacting-faces being made slightly oblique or inclined relatively to the plane of the seating-faces, in order that as they are put into engagement by an oscillatory movement these inclined faces may exert a wedging action to draw the two heads tightly together. Other locking provisions may, however, be substituted for those shown, many different means for interlocking twin coupling heads being known in the art.

The particular arrangement of locking-arms $c$ and $d$ described is adopted in order to enable my improved coupler to intercouple with the Gibbs coupler in the manner shown in Fig. 7, where A' designates the head of the Gibbs coupler with its locking-arms $c'$ and $d'$. In the Gibbs coupler both these arms are made as rigid projections from the head A'.

The coupling-heads A A are formed on their adjoining sides with communicating openings or ports $e$ $e$, and each head is provided with a seat C, consisting of a ring of suitable material encircling the port and presenting a seating-face projecting slightly beyond the side of the head. According to my invention this seat is fixed rigidly or at least unyieldingly to the head, in contradistinction to being mounted on a diaphragm or piston, so as to be movable out and in relatively to the head. The preferred construction is that clearly shown in Fig. 2, wherein the seat C is placed in a groove in the side of the head, so that it rests solidly against the material thereof and is confined therein by a fastening-ring D, having screw-threads engaging threads on the head, and having an internal flange which engages an external flange on the seat C. Other means for clamping or binding the seat to the head may, however, be substituted.

The opposite or outer side of the coupling-head, instead of being a closed wall of solid metal, as heretofore, is formed with an opening $f$, which in the preferred construction is closed by a flexible diaphragm E, held in place by a ring $g$ or other fastening means, as shown in Fig. 2. As an equivalent of a diaphragm a piston might be used, as shown at E' in Fig. 10; but the diaphragm is preferable. I prefer to back the diaphragm with a disk of rigid metal $h$, which nearly fills the opening within the ring $g$ and protects the diaphragm from any mechanical injury. The middle of this disk $h$ is preferably raised and comes against a lever-arm F, which is arranged across the outer side of the head, its construction being such that it is adapted to receive the outward thrust of the diaphragm, (transmitted to it through the plate $h$,) and transmit this thrust to the opposite coupling-head in order to draw the seats of the two heads into tighter contact. In the preferred construction the lever F is fulcrumed at one end at $i$, and is formed on its other end with the locking arm or plate $c$, so that this locking-arm, instead of being a fixed part of the head, as in the Gibbs coupling, for example, is made movable to a slight extent. The extent of movement is limited by stops applied to the lever F. Preferably these stops are formed in connection with means for supporting and retaining in place the lever at the end thereof adjacent to the locking-plate $c$. For this purpose I provide preferably two projecting arms or lugs $j$, cast integrally with the head A and loosely embracing the lever F on opposite sides, a pin $j'$ being arranged between the lugs and riveted to them in position just outside the lever, so that this pin prevents the displacement of the lever in direction away from the head, while the lugs $j$ prevent its displacement upwardly or downwardly. The lever is formed with notches $k$ $k$ on opposite sides, as shown in Fig. 6, and the lugs enter these notches, the notches being somewhat longer than the width of the lugs, so that the lever has the requisite motion in direction toward or from the opposite head, while the ends of the notches constitute shoulders abutting against the sides of the lugs for forming stops to limit the movement of the lever in such direction.

In the act of locking the two heads together in coupling the locking-plate $c$ and lever F are drawn toward the opposite head until stopped by the ends $l$ of these notches, whereby the two heads are enabled to be firmly joined or wedged together by the locking projections $c\ d$. When steam is turned on, the outward thrust of the diaphragm against the lever moves it outwardly a very slight distance, sufficient only to bring the seats into sufficiently firm contact and thereby move the shoulders $l\ l$ out of contact with the sides of the lugs. The opposite shoulders $l'$ do not come in contact with the lugs in this automatic tightening movement, but are designed only for preventing the lever F being displaced too far outwardly to leave the locking-plate $c$ in position for properly engaging the locking-arm $d$ of the opposite head. As the angular movement of the lever is very slight, the fulcrum $i$ is preferably constructed by thrusting the end of the lever beneath an eye or stirrup formed on the back or outer side of the coupling-head, so as to constitute a loose rocking connection. When the pin $j'$ is afterward put in place and riveted fast, it prevents the movement of the lever in such direction as would free its end from this stirrup.

My improved coupler has the advantage that the seat C is solidly seated against the metal coupling-head, so that any blow which it may receive is firmly resisted and will not result in forcing its seating-face out of the proper plane. Where the seat is mounted on a diaphragm, an accidental blow is liable to distort the diaphragm so as to throw the seat out of the true plane, as well as to injure the diaphragm or its connection and give rise to leakage. My invention of the solidly-supported seat with an independent diaphragm arranged at the opposite or rear side of the head wholly avoids this difficulty. The diaphragm is thoroughly protected from injury by reason of its being mounted deeply within an opening and covered over by the protecting-disk $h$.

Figs. 8 and 9 show a modified construction wherein both the locking arms or plates $c$ and $d$ are mounted on the lever F, instead of one of them $d$ being fixed to the coupling-head, as in the construction first described. This construction necessitates that the lever F (here lettered $F'$) shall be carried around three sides of the coupling-head, terminating at diametrically-opposite points in the plates $c\ d$, (here lettered $c^2\ d^2$,) while its middle portion crosses the rear or outer side of the head to receive the reaction of the diaphragm. To hold the lever in place, it is guided by suitable guides or projecting ears or pins engaging it as close as is practicable to the respective plates $c^2$ and $d^2$, and at other points if necessary. In the construction shown the end of the lever adjacent to the plate $c$ is engaged by projecting ears $m\ m$, while on the opposite side of the head it is confined between the neck $a$ and a projecting ear $n$, stops $o\ o$ being formed on the lever to rest against the outer side of the head and limit the extent to which the plates $c^2\ d^2$ shall yield during the locking movement of the heads. Lateral guides $p$ are also preferably provided to engage the intermediate portion of the lever. To enable the levers to cross the heads diametrically, the necks or tubular shanks $a\ a$ may conveniently be carried downward from the heads and then directed upward in the manner shown in Fig. 9.

Fig. 10 shows a further modification wherein the levers F are dispensed with, the reactive thrust of the diaphragm or its equivalent being exerted against an arm $F^2$, formed rigidly on the opposite head, preferably by being cast integrally therewith. The thrust of the diaphragm against this arm is exerted to draw the two heads more tightly together; but instead of this pressure being communicated through the locking-faces $c\ d$ (here lettered $c^3\ d^3$) as before, it is transmitted independently of them and in such manner as to tend to draw the locking-faces out of contact. The former construction, by forcing the locking-faces more tightly into contact when the internal pressure is turned on, is preferable to the one shown in Fig. 10. In this figure is also shown the substitution of a piston $E'$ for the diaphragm E, the mechanical effect being the same, but the piston being inferior because of the difficulty of maintaining a tight packing.

At $q$ in Figs. 1, 2, 9, and 10 is shown a threaded opening in a boss adjoining the coupling-head, into which opening a steam-trap or relief-valve $r$ is screwed, as shown in Figs. 1 and 2. This trap in its preferred construction consists of a simple gravity check-valve so mounted that by its own weight it stands normally open; but by reason of being placed on the inner side of its seat it closes automatically when the pressure is turned on. This trap is claimed in my application, Serial No. 408,514, filed October 12, 1891. The water of condensation which flows into the coupling will be drained off by the automatic opening of the valve upon the turning off of the pressure.

My invention is not necessarily limited to a coupling in which the seating-faces are arranged laterally, but may be applied to oblique-port or direct-port couplings. Figs. 11 and 12 show one manner in which it may be applied to a direct-port coupling. In these figures the port $e'$ and seat $C'$ are arranged at the outer end of the coupling-head, as usual in such couplings, the coupling-head being provided with the usual locking projections $s$ on one side and locking-arm $t$ projecting from the other and having the locking projections $e'$. At the opposite end of the coupling-head is arranged a diaphragm $E^2$, which reacts outwardly against a sliding frame $F^3$, on which the locking projections are formed. The act of locking the two coupling-heads together is the same as with other couplings of this type—such, for example, as the Sewall coupling; but when steam is turned on the outward pressure on the diaphragm of one coupling is exerted against the frame F³ to retract the locking projections s and t, and thereby to draw the two couplings into closer contact at their seating-faces. It will be seen that this construction constitutes a mere modification of the constructions shown in Figs. 8 and 9.

Although according to my present invention it is preferable that the seat shall be unyieldingly mounted against the abutting side of the coupling-head, yet it is not essential that the seat be immovable, since a compensating seat movable to bring its seating-face into parallel contact with that of the opposite seat might be applied—as, for example, by making the seat in the segment of a sphere. The use of a somewhat elastic or yielding material for the seat is preferable; but a hard or unyielding material might be used, and in such case a yielding cushion might be interposed between the seat and the bottom of the groove in the coupling-head in which the seat is held. Such a cushion may be applied, as shown at u in Fig. 10.

It will be understood that where a diaphragm is referred to in the claims it is my intention to cover equally any mechanical equivalent of a diaphragm, such as a piston, where the substitution of such equivalent in place of a diaphragm is admissible.

I claim as my invention the following-defined novel features, substantially as hereinbefore specified, namely:

1. In a pipe-coupling, a coupling-head having locking-faces for coupling it to a reciprocal head, a seat mounted on the abutting side of the head, a diaphragm movable under fluid-pressure, arranged at the opposite side of the head, and means for transmitting the outward thrust of said diaphragm to the opposite head to force the seats of the two heads firmly together during the maintenance of fluid-pressure within the coupling.

2. In a pipe-coupling, a coupling-head having locking-faces for coupling it to a reciprocal head, a seat mounted on the abutting side of the head, a diaphragm movable under fluid-pressure, arranged at the opposite side of the head, and a movable part for receiving the thrust of said diaphragm and transmitting it to the opposite head to force the seats of the two heads firmly together during the maintenance of fluid-pressure within the coupling.

3. In a pipe-coupling, a coupling-head having locking-faces for coupling it to a reciprocal head, a seat mounted on the abutting side of the head, a diaphragm movable under fluid-pressure, arranged at the opposite side of the head, and a lever-arm arranged to receive the thrust of said diaphragm and transmit it through the locking-faces to the opposite head to force the seats of the two heads firmly together during the maintenance of fluid-pressure within the coupling.

4. In a pipe-coupling, a coupling-head adapted to be coupled with a reciprocal head, having a seat mounted on the abutting side of the head, a diaphragm movable under fluid-pressure, arranged at the opposite side of the head, and a lever-arm arranged to receive the thrust of said diaphragm and formed with a locking-face adapted to engage a reciprocal locking-face on the opposite head.

5. The combination of a pair of reciprocal coupling-heads adapted to couple together, formed with seats mounted on their abutting sides and with diaphragms arranged at their opposite sides, combined with movable parts mounted on each of the heads arranged to receive the thrust of the diaphragms and formed with locking-faces, by the engagement of which the heads are coupled together, whereby the outward thrust of the diaphragms under fluid-pressure is transmitted through the respective locking-faces from each head to the other in direction to force the seats of the two heads firmly together.

6. In a pipe-coupling, a coupling-head A, provided with locking projections c and d for coupling it to a reciprocal head, a seat mounted on the abutting side of the head, a diaphragm arranged at the opposite side of the head, and a lever-arm arranged to receive the thrust of said diaphragm, formed on one end with one of said locking projections and with stops to limit its movement relatively to the coupling-head, whereby in coupling it is drawn against said stops by the wedging action of the locking-faces and upon the turning on of fluid-pressure the thrust of the diaphragm is transmitted through the lever and locking projections to the opposite head.

7. In a pipe-coupling, a coupling-head having a rigidly-mounted locking projection d, a seat mounted on the abutting side of the head, a diaphragm arranged at the opposite side of the head, and a lever-arm F, arranged to receive the outward thrust of said diaphragm and formed with a locking projection c.

8. The combination of a coupling-head A, having a seat C and diaphragm E on opposite sides and formed with a locking projection d and guiding-ears j j, with a lever-arm F, arranged to receive the outward thrust of said diaphragm, formed with a locking projection c, said lever-arm guided by said ears j j and formed with opposite stops l l', abutting against said lugs to limit its movement.

9. The combination of a coupling-head A, having a seat C and diaphragm E on opposite sides and formed with a locking projection d and guiding-ears j j, with a lever-arm F arranged to receive the outward thrust of said diaphragm, fulcrumed to said head, formed with a locking projection c and guided between said ears j, and a pin j', fastened between said ears as a guide to prevent the endwise displacement of the lever.

10. In a pipe-coupling, a coupling-head A, having openings on opposite sides, a seat C surrounding one opening, and a diaphragm E closing the other opening, a reinforcing-disk h, covering the outer side of said diaphragm, and a part arranged to receive the thrust of said diaphragm and transmit said trust to a reciprocal coupling-head with which said head may be coupled.

In witness whereof I have hereunto signed my name in the presence of two subscribing witnesses.

EDWARD E. GOLD.

Witnesses:
GEORGE H. FRASER,
FRED WHITE.